(12) United States Patent
Thirumalai et al.

(10) Patent No.: US 11,228,580 B2
(45) Date of Patent: Jan. 18, 2022

(54) TWO-FACTOR DEVICE AUTHENTICATION

(71) Applicant: Apple Inc., Cupertino, CA (US)

(72) Inventors: Gokul P. Thirumalai, Mountain View, CA (US); Daniel B. Pollack, San Jose, CA (US); Robert D. Butler, Middletown, DE (US); Ryan W. Baker, Los Altos, CA (US); David G. Knipp, San Jose, CA (US); Sudhakar N. Mambakkam, Saratoga, CA (US); Jonathon Sodos, Los Gatos, CA (US); Hannah S. Story, San Mateo, CA (US); Hervé Sibert, Le Mans (FR); Gianpaolo Fasoli, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 490 days.

(21) Appl. No.: 16/147,451

(22) Filed: Sep. 28, 2018

(65) Prior Publication Data

US 2019/0394189 A1 Dec. 26, 2019

Related U.S. Application Data

(60) Provisional application No. 62/689,789, filed on Jun. 25, 2018.

(51) Int. Cl.
*H04L 9/32* (2006.01)
*H04L 29/06* (2006.01)
*H04W 12/06* (2021.01)
*H04W 12/08* (2021.01)
*H04W 4/14* (2009.01)

(52) U.S. Cl.
CPC ........ *H04L 63/0823* (2013.01); *H04L 9/3247* (2013.01); *H04L 9/3297* (2013.01); *H04L 63/0838* (2013.01); *H04L 63/0876* (2013.01); *H04L 63/102* (2013.01); *H04L 63/12* (2013.01); *H04W 4/14* (2013.01); *H04W 12/06* (2013.01); *H04W 12/08* (2013.01); *H04L 2463/082* (2013.01); *H04L 2463/121* (2013.01)

(58) Field of Classification Search
CPC ..... H04L 9/32; H04L 63/0823; H04L 9/3247; H04W 12/06
See application file for complete search history.

(56) References Cited

U.S. PATENT DOCUMENTS

| 2013/0132717 | A1* | 5/2013 | Brand | H04L 9/3247 |
| | | | | 713/156 |
| 2016/0149710 | A1* | 5/2016 | Huxham | H04W 12/0608 |
| | | | | 713/175 |

* cited by examiner

*Primary Examiner* — Izunna Okeke
(74) *Attorney, Agent, or Firm* — Morgan, Lewis & Bockius LLP

(57) ABSTRACT

Implementations of the subject technology provide for performing, by a device, a request for obtaining information related to a phone authentication certificate (PAC) that was generated for the device, the PAC authenticating that a particular phone number is associated with the device, the request including packets of data. The subject technology receives the information related to the PAC, the information including an indication that the PAC was generated for the device. The subject technology sends, from the device, a request for validating the PAC to a remote server based at least in part on the information related to the PAC. Further, the subject technology receives a confirmation of validating the PAC from the remote server based at least in part on the information related to the PAC.

20 Claims, 7 Drawing Sheets

TWO-FACTOR DEVICE AUTHENTICATION

CROSS-REFERENCE TO RELATED APPLICATIONS

The present application claims the benefit of U.S. Provisional Patent Application Ser. No. 62/689,789, entitled "TWO-FACTOR DEVICE AUTHENTICATION," filed Jun. 25, 2018, which is hereby incorporated herein by reference in its entirety and made part of the present U.S. Utility Patent Application for all purposes.

TECHNICAL FIELD

The present description relates generally to providing authentication on electronic devices to provide access to one or more services.

BACKGROUND

Multi-factor authentication is an approach to security authentication, which may require that a user of a given network provide more than one form of verification to prove the user's identity and allow access to the network. Multi-factor authentication therefore advantageously utilizes a combination of several factors of authentication. Examples of such factors may include: 1) verification by something the user knows (e.g., a password, or a personal identification number, etc.); 2) something the user has (e.g., a smart card, a security fob, a hardware or virtual token, a USB dongle, or a digital certificate, etc.); and 3) something the user is (e.g., a biometric characteristic, e.g., a fingerprint, a facial image, a retinal pattern, a voice print, etc.).

Two-factor authentication (also referred to as 2FA) is a type (subset) of multi-factor authentication. In an example, 2FA may confirm a user's claimed identity by utilizing a combination of two different factors of the multi-factor authentication discussed above (e.g., something the user knows, something the user has, or something the user is).

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Usage of mobile electronic devices to access services and content in the cloud (e.g., a form of Internet-based computing) has become more prevalent. This increased use of mobile electronic devices has led to additional requirements for security. As a result, different forms of authentication, e.g., that are stronger than passwords, may be required to access services and to execute operations in a secure manner, which may be provided through using multi-factor authentication. Existing approaches to multi-factor authentication, however, may be inflexible in implementation, inconvenient for users, and costly for service providers. Such service providers, in an example, may provide other services that are separate from cellular services provided by a given cellular service provider, and therefore may require additional authentication of phone numbers for mobile electronic devices. In particular, for authenticating a phone number of a given mobile electronic device, some existing approaches are reliant on short message service (SMS) messages for implementing multi-factor authentication. SMS messages are typically associated with a financial cost that is absorbed by the service provider and/or the user. Thus, as the number of users increases for a service, the reliance on SMS messages for multi-factor authentication may become increasingly costly for the service provider.

The subject system described herein provides a flexible approach to multi-factor authentication, particularly with respect to implementing two-factor authentication of a phone number associated with a given electronic device with telephony capabilities. In some examples, such a phone number may be associated with a user account for accessing one or more services (e.g., messaging, video conferencing, etc.). In particular, the flexible approach of the subject system allows a service provider to perform two-factor authentication without using SMS messages, and thereby without having to absorb the costs associated therewith.

Figure 1:
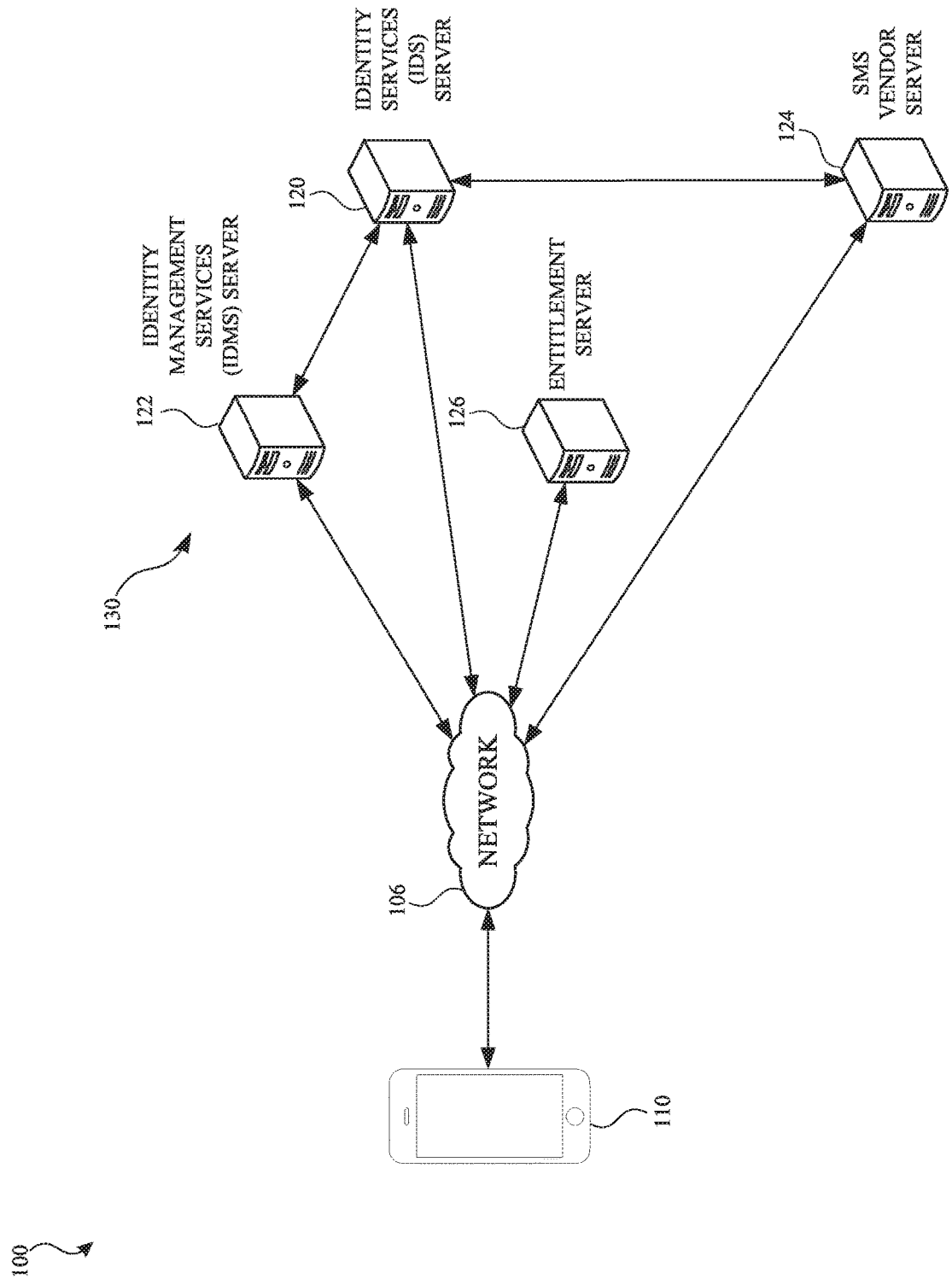
FIG. 1 illustrates an example network environment including an electronic device that may implement the subject system in accordance with one or more implementations.

FIG. 1 illustrates an example network environment 100 including an electronic device 110 that may implement the subject system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 110, an identity service (IDS) server 120, an identity management services (IDMS) server 122, a short message service (SMS) vendor server 124, and an entitlement server 126. For explanatory purposes, the network environment 100 is illustrated in FIG. 1 as including the electronic device 110, the IDS server 120, the IDMS server 122, the SMS vendor server 124, and the entitlement server 126; however, the network environment 100 may include any number of electronic devices and any number of servers or a data center including multiple of the servers in the group of servers 130. Moreover, as further illustrated, some of the servers in the group of servers 130 may be communicatively coupled with another server within the group of servers 130 to facilitate sending and/or receiving messages to and from each server as discussed further herein.

The network 106 may communicatively (directly or indirectly) couple, for example, the electronic device 110 with the IDS server 120, the IDMS server 122, the SMS vendor server 124, and/or the entitlement server 126. In one or more implementations, the network 106 may be an interconnected network of devices that may include, or may be communicatively coupled to, the Internet.

The electronic device 110 may include a touchscreen and may be, for example, a smartphone that includes a touchscreen, a portable computing device such as a laptop computer that includes a touchscreen, a peripheral device that includes a touchscreen (e.g., a digital camera, headphones), a tablet device that includes a touchscreen, a wearable device that includes a touchscreen such as a watch, a band, and the like, any other appropriate device that includes, for example, a touchscreen, or any electronic device with a touchpad. In one or more implementations, the electronic device 110 may not include a touchscreen but may support touchscreen-like gestures, such as in a virtual reality or augmented reality environment. In one or more implementations, the electronic device 110 may include a touchpad. In FIG. 1, by way of example, the electronic device 110 is depicted as a mobile smartphone device with a touchscreen. In one or more implementations, the electronic device 110 may be, and/or may include all or part of, the electronic device discussed below with respect to the electronic system discussed below with respect to FIG. 7.

The IDS server 120 and/or the IDMS server 122 may form all or part of a network of computers or the group of servers 130, such as in a cloud computing or data center implementation. The IDS server 120 and/or the IDMS server 122, for example, may provide identity services and may manage credentials associated with the electronic device 110. The IDS server 120 may also issue a phone authentication certificate based on such credentials. In an example, the entitlement server 126 is provided by a cellular service provider and may be deployed to handle entitlement requests conferring capability and/or security permissions, such as for enabling services such as Wi-Fi calling, VoLTE, etc. Further, the IDS server 120, the IDMS server 122, and/or the entitlement server 126 may provide various authentication services in response to requests for authentication from the electronic device 110 as discussed further below. In an example, the IDS server 120 and/or the IDMS server 122, which form the group of servers 130, may be associated with a particular service provider or entity, e.g. different from the cellular service provider. Moreover, the IDS server 120 can be combined with the IDMS server 122 in at least an implementation, and/or one or more of the IDS server 120 and/or the IDMS server 122 may not be included in one or more implementations.

The SMS vendor server 124, in an example, provides access to SMS services including functionality related to an SMS gateway that enables the electronic device 110 to send or receive SMS messages to or from a telecommunications network. The SMS vendor server 124 may be external to the group of servers 130, in an example, where the SMS vendor server 124 may be provided by a third party different than the service provider associated with the group of servers 130 and/or different from the cellular service provider. In one or more implementations, the SMS vendor server 124 may facilitate one or more authentication processes performed by the electronic device 110 and one or more servers of the group of servers 130, such as by receiving and/or sending SMS messages. The SMS vendor server 124 may charge fees for the transmission and/or reception of SMS messages, such as to the user of the electronic device 110 and/or to the service provider associated with the group of servers 130. Although a single SMS vendor server is discussed, multiple SMS vendor servers may be utilized.

The subject system allows the group of servers 130 and the electronic device 110 to perform some or all of the authentication processes without facilitation from the SMS vendor server 124. In this manner, the fees charged by the SMS vendor server 124 can be avoided, reducing the cost associated with the authentication processes, which may become significant at scale. In addition, since the SMS vendor server 124 is controlled by a third party (e.g., relative to the service provider associated with the group of servers 130), the overall security of the authentication processes may be strengthened by removing the SMS vendor server 124 (e.g., associated with a third party) from the authentication process. Example communication flows corresponding to performing the authentication processes without facilitation from the SMS vendor server 124 are discussed further below with respect to FIGS. 4 and 5.

Figure 2:
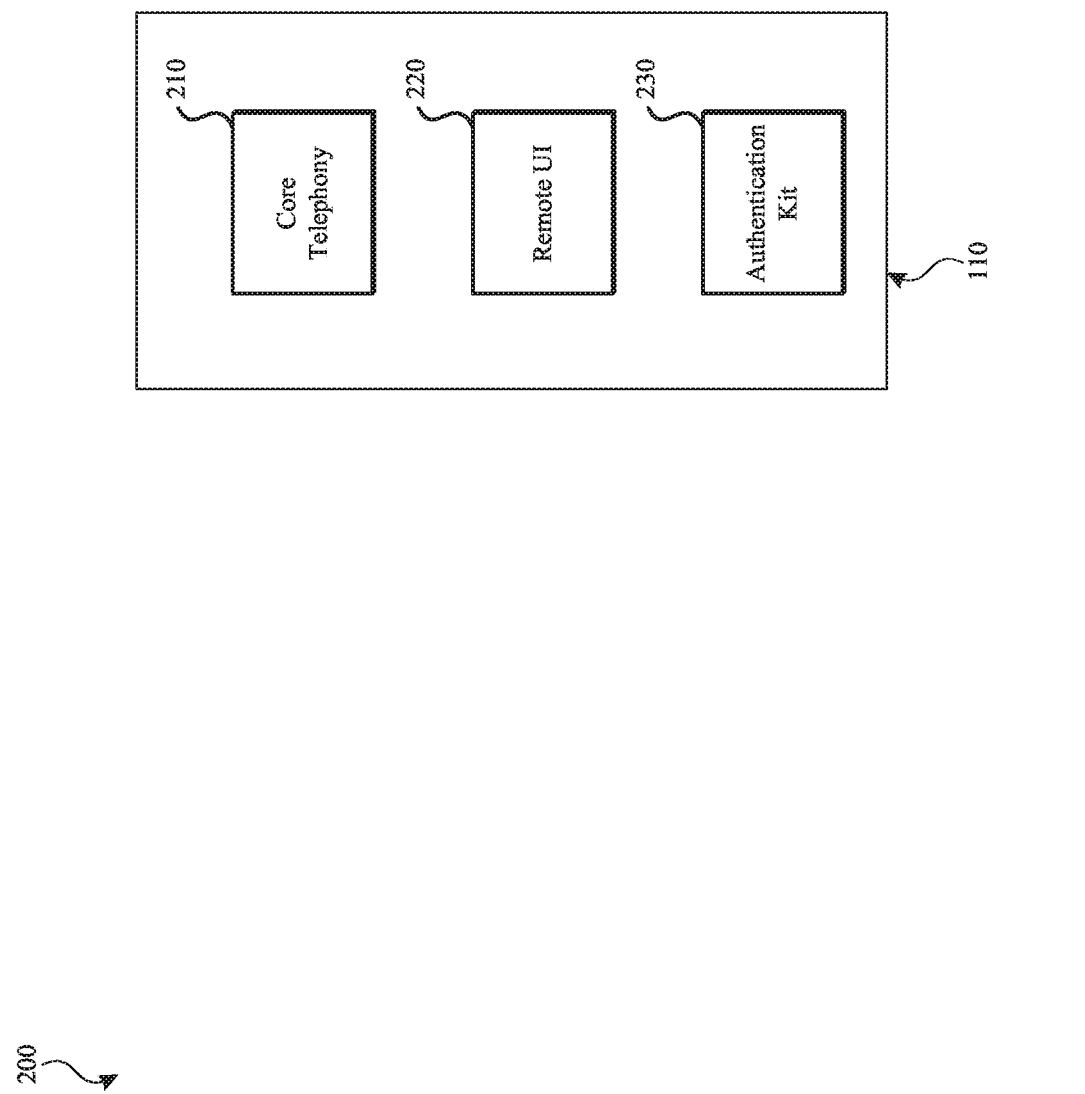
FIG. 2 illustrates an example software architecture that may be implemented on an electronic device in accordance with one or more implementations.

FIG. 2 illustrates an example software architecture 200 that may be implemented on an electronic device 110 in accordance with one or more implementations. For explanatory purposes, the software architecture 200 is described as being implemented by the electronic device 110 of FIG. 1, such as by a processor and/or memory of the electronic device 110; however, the software architecture 200 may be implemented by any other electronic device. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The software architecture 200, as implemented on the electronic device 110, includes different frameworks. A framework, as used herein, can refer to a software environment that provides particular functionality as part of a larger software platform to facilitate development of software applications, and may provide one or more application programming interfaces (APIs) that may be utilized by developers to design, in a programmatic manner, user interfaces and to handle operations for such user interfaces including animations and layout of graphical elements.

As illustrated, a core telephony framework 210, remote user interface (UI) framework 220, and an authentication kit framework 230 are provided. The core telephony framework 210 may provide functionality to obtain information about a user's cellular service provider (e.g., the service provider with whom the user has a cellular account), the user's subscriber information, information about cellular calls, information about a call (e.g., a unique identifier and state information), and SIM (subscriber identity module) card related information, among other types of telephony-related information, as well as sending and receiving messages, such as SMS messages. The remote UI framework 220 may provide functionality for enabling remote electronic devices (e.g., the IDS server 120 and/or the IDMS server 122) to provide UIs to the electronic device 110. Further, the authentication kit framework 230 provides functionality to perform authentication-related functions to verify the user's phone number associated with the electronic device 110 as discussed further herein.

In implementations described herein, access to a given service provider's network and/or services (e.g., the service provider associated with the group of servers 130 which may be different from a cellular service provider) may require two-factor authentication of a phone number associated with a given electronic device. One manner of implementing two-factor authentication may involve a certificate (e.g., a phone authentication certificate or "PAC") that is issued for the electronic device. The issuance of the phone authentication certificate to the electronic device may involve a communication flow with facilitation from the SMS vendor server 124 (e.g., as described in FIG. 3) and/or a communication flow without facilitation from the SMS vendor server 124 (e.g., as described in FIGS. 4 and 5).

As described above, one aspect of the present technology is the gathering and use of data available from specific and legitimate sources to improve the delivery to users of invitational content or any other content that may be of interest to them. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to deliver targeted content that may be of greater interest to the user in accordance with their preferences. Accordingly, use of such personal information data enables users to have greater control of the delivered content. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely block the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

Figure 3:
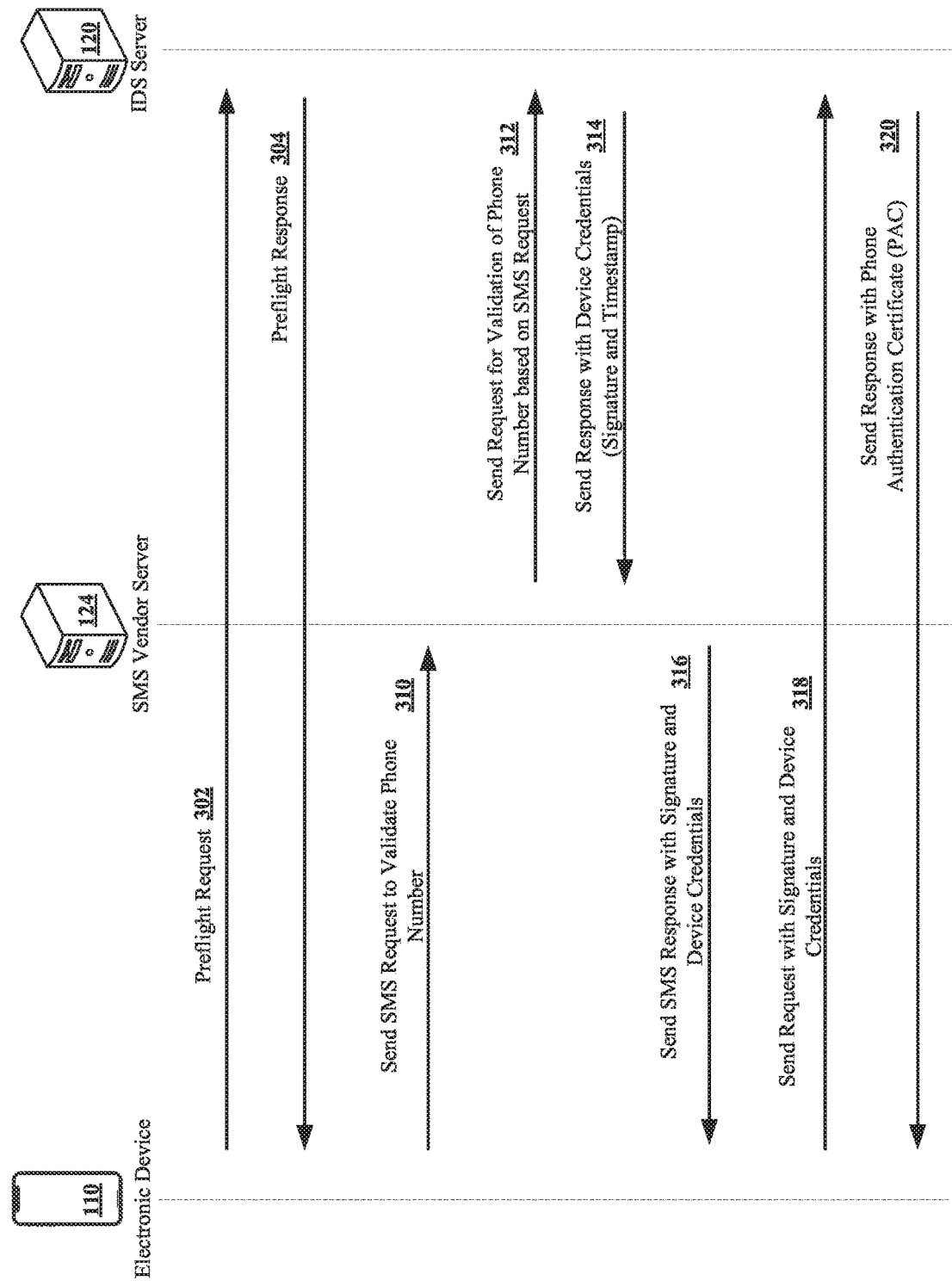
FIG. 3 illustrates an example sequence diagram showing communication related to an SMS (Short Message Service) based communication for receiving a phone authentication certificate between computing devices over various communication channels.

FIG. 3 illustrates an example sequence diagram showing communication related to an SMS (Short Message Service) based communication, for receiving a phone authentication certificate, between computing devices over various communication channels. FIG. 3 will be discussed with reference to components of FIG. 1, namely the electronic device 110, the SMS vendor server 124, and the IDS server 120. As shown, the diagram shows interactions between the electronic device 110, the SMS vendor server 124, and the IDS server 120.

As referred to herein, a phone authentication certificate may be utilized by the electronic device 110 as proof of ownership of a phone number corresponding to an account of a user and/or the electronic device 110, where the account is issued and/or managed by the IDS server 120 and/or the IDMS server 122. In this regard, the phone authentication certificate is used as part of a two-factor authentication (e.g., as being something the user possesses) implementation for the electronic device 110.

Upon activation, in some implementations, the electronic device 110 may register itself for use and/or to gain access to a given service provider's network that provides services outside of the services provided by a cellular service provider. In an example, such a service provider's network may provide access to services that are separate from and/or in addition to services provided by the cellular service provider, such as cloud services and the like. Implementations of the electronic device 110 as described herein may perform the following operations as part of this registration process.

In an implementation, the electronic device 110 sends a preflight request 302 to the IDS server 120. After receiving the preflight request 302, the IDS server 120 sends a preflight response 304 indicating that the electronic device 110 should use SMS messaging for receiving a phone authentication certificate. In an example, after receiving the preflight response 304, the electronic device 110, using the core telephony framework 210, can send the SMS vendor server 124 an SMS message including a request 310 for validating a phone number associated with the electronic device 110. The contents of the request 310, in an implementation, may include the phone number associated with the electronic device 110 and/or a push token. In this regard, the SMS message may be sent from a phone number associated with the electronic device 110, such as a phone number tied to a subscriber identity module (SIM) of the electronic device 110. The electronic device 110, in an example, utilizes an SMS protocol for sending an SMS message in the request 310 for sending to the SMS vendor server 124. In an example, the SMS vendor server 124 may provide a specific phone number associated with the SMS vendor server 124 for the electronic device 110 to send the SMS message. Moreover, the electronic device 110 may use a cellular communication channel established via a cellular service provider's network, for sending the SMS message.

In the example of FIG. 3, the SMS vendor server 124 may communicate with the IDS server 120 for forwarding the request 310 from the electronic device 110. The SMS vendor server 124, upon receiving the request 310 from the electronic device 110, sends a request 312 to the IDS server 120 for validating the phone number included with the request 310 from the electronic device 110. In an example, the SMS vendor server 124 utilizes a standard protocol (e.g., HTTP) over a communication channel to send the request 312 to the IDS server 120. The SMS vendor server 124, in some examples, may convert the SMS message from the electronic device 110 into an HTTP request message for sending to the IDS server 120.

The IDS server 120 can validate the request 312 by inspecting the content of the request 312. In an implementation, the IDS server 120 at least determines that the content (e.g., payload) of the request 312 is in a proper format. After processing the request 312, the IDS server 120 generates a digital signature ("signature"), and sends a response 314 to the SMS vendor server 124 including the digital signature, along with a timestamp related to when the digital signature was created. Alternatively, the timestamp may be related to a current time. The digital signature and/or the timestamp may be collectively referred to as credentials. Although the request 312 and the response 314 may be transmitted via HTTP, the request 312 and the response 314 are transmitted as separate individual messages.

In an implementation, the IDS server 120 validates that the request 312 meets the expected format and has the expected parameters. The request 312 may include information indicating a version, such as a version number, and the size and number of parameters vary depending on the version of the request 312. The request 312 also includes a prefix to ensure that the IDS server 120 only processes messages that are expected instead of any message. The version number in the body of the request 312 ensures that the IDS server 120 knows which format the rest of the request 312 is in.

In an implementation, the request 312 will include a push token. Alternately, if the push token is too large to fit in the SMS payload, the request 312 will include a hash of the push token. In an example, the IDS server 120 validates that the length of the push token is correct; however, it is appreciated that additional operations for validation of the push token may be performed. Some versions of the request 312 include fields that form a device ID, which is based on the UDID (Unique Device Identifier), ICCID (integrated circuit card identifier) and MEID (mobile equipment identifier) of the electronic device 110. The request 312 also includes a request ID that is used in the response 314 so that the electronic device 110 can correlate the response 314 to the original request (e.g., the request 310) that was previously sent by the electronic device 110. The IDS server 120 also inspects meta information sent along with the request 312 by the SMS vendor server 124 such as the phone number that the SMS vendor server 124 believes the request 310 was sent from. The response 314 includes the push token (if sent) or the push token hash. The response 314 also includes a timestamp and the phone number as obtained from the meta information of the request 312. The response 314 may also include the device ID if sent. The returned fields are then signed by the IDS server 120 using a certificate/secret known only to the IDS server 120.

After receiving the signature and the timestamp from the IDS server 120, the SMS vendor server 124 can forward these credentials over SMS to the electronic device 110 in an SMS response message 316. The credentials can be utilized for requesting a phone authentication certificate for the electronic device 110 and, in an implementation, be in the form of a push token, e.g. the push token included in the SMS request. The SMS vendor server 124 may include a payload as a string with the aforementioned information received from the IDS server 120 that can be returned as an SMS message (e.g., the SMS response message 316) back to the electronic device 110. When returning the SMS response message 316, additional headers and meta information in the SMS response message 316 may be included to provide hints to the electronic device 110 that the response 314 is not a normal text message (e.g., to be displayed to the user) and instead should be processed automatically and in the background. Ultimately, the SMS response message 316 is sent back to the phone number that it was sent from (e.g., the phone number of the electronic device 110). The electronic device 110, after receiving the signature and the credentials from the SMS response message 316, can send a request 318 to authenticate the phone number associated with the electronic device 110, where the request 318 includes the signature and the credentials, to the IDS server 120.

The IDS server 120, after receiving the request 318, can examine the credentials, which may include the same push token that was provided in the SMS request 310. The IDS server 120 can validate that the signature from the request 318 is valid, and that the push token was the same push token included in the SMS Request 310, thereby verifying that the credentials issued over SMS are valid for the electronic device 110 (e.g., by confirming that the IDS server 120 previously issued the credentials), and issue a phone authentication certificate (PAC) for the electronic device 110. The IDS server 120 sends a response 320 including the PAC to the electronic device 110.

In an implementation, the PAC is a long-lived credential that can be utilized to validate that the electronic device 110 owns the phone number that was included in the SMS request 310, and in an implementation, includes the phone number from the SMS request 310 from the electronic device 110. However, the electronic device 110 may discard or invalidate the PAC under certain scenarios, such as when the SIM card is removed from the electronic device 110, when a password change occurs with respect to an account associated with the electronic device 110, when another electronic device authenticates the phone number, and the like.

In an implementation, the PAC includes the phone number, push token and the timestamp of the original credentials obtained from either the SMS (Short Message Service) based communication in FIG. 3 or credentials obtained without using SMS as discussed in FIG. 4 below. In this manner, it can be determined when the SMS based or without SMS validation was performed in addition to when the PAC was generated. This may allow the electronic device 110 to request a new PAC using existing credentials, e.g., as a further cost saving measure. The PAC may also include other details including a machine ID (MID). The MID, in an example, is generated by the IDMS server 122 and provided to the electronic device 110. The IDMS server 122 can request the MID to be re-generated and swapped on demand. In a scenario where the PAC is generated without using SMS, the PAC may include details about which provider was used. This may be generally referred to as the "Carrier Signature Host" (csh). As the PAC is a certificate (e.g., public key cryptography), the PAC can include a not-before and not-after date. The not-before date is set to the current time and the not-after date is, in an example, set to ten years from the current time, but could be set to some other value. Other fields may or may not exist in the certificate and the fields in the certificate may change at the discretion of the IDS server 120. For example, less information may be included in the PAC and other information may be stored in a database for IDS server 120. By storing information with the PAC's serial number, the PAC can be associated with the information in the IDS server 120 database. As a result, the certificate can be smaller in size and the need to re-generate the certificate is avoided when information associated with the certificate (e.g., the MID) changes. Instead, the information can just be updated in the database.

Accordingly, the approach described in FIG. 3 allows the IDS server 120 to confirm that the electronic device 110 can both send and receive SMS messages via the phone number, which strengthens the likelihood that the electronic device 110 is in possession of the phone number. However, as previously discussed, the approach described in FIG. 3 utilizes two SMS messages, which may incur fees that may become significant at scale. Alternatively, in some implementations, when the electronic device 110 does not have access to SMS, the communication flow described above in FIG. 3 fails for a particular reason, and/or the service provider associated with the group of servers 130 would like to avoid the fees incurred by sending SMS messages through the SMS vendor server 124, a different approach, that does not use SMS, may be utilized by the electronic device 110 to receive the PAC.

Figure 4:
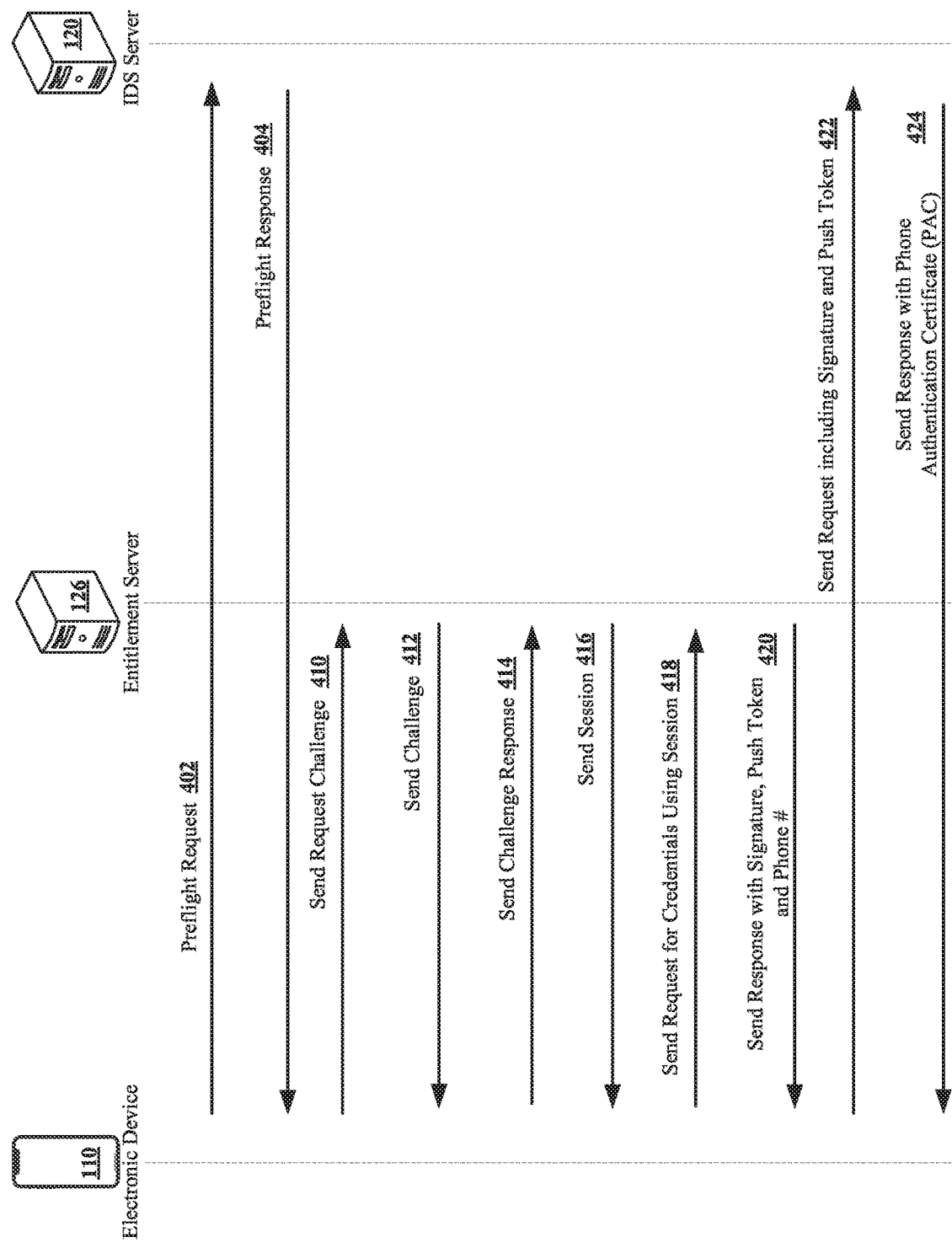
FIG. 4 illustrates an example sequence diagram showing communication, without using SMS, for receiving a phone authentication certificate, between computing devices over various communication channels.

FIG. 4 illustrates an example sequence diagram showing communication, without using SMS (as discussed in FIG. 3), for receiving a phone authentication certificate, between computing devices over various communication channels. FIG. 4 will be discussed with reference to components of FIG. 1, namely the electronic device 110, the entitlement server 126, and the IDS server 120. As shown, the diagram shows interactions between the electronic device 110, the entitlement server 126, and the IDS server 120. In the example of FIG. 4, the entitlement server 126 may be responsible for generating a challenge in response to a request from the electronic device 110 that initiates a process for receiving the phone authentication certificate.

In an implementation, the electronic device 110 sends a preflight request 402 to the IDS server 120. After receiving the preflight request 402, the IDS server 120 sends a preflight response 404 indicating that the electronic device 110 should avoid using SMS messaging for receiving a phone authentication certificate. To establish security between the electronic device 110 and the entitlement server 126 (while also avoiding the cost associated with sending one or more SMS messages), the communication flow between the electronic device 110 and the entitlement server 126 using messages that are not sent and/or received using SMS and/or not using SMS that incurs fees. Initially, after receiving the preflight response 404, the electronic device 110 can send a request 410 for a challenge to the entitlement server 126. After receiving the request 410, the entitlement server 126 can send a challenge 412 to the electronic device 110.

The electronic device 110, after receiving the challenge 412, sends a challenge response 414 to the entitlement server 126. The electronic device 110, in an implementation, may utilize cryptographic information (e.g., a particular security key) on the SIM card of the electronic device 110 to generate a response to the challenge from the entitlement server 126. The entitlement server 126 determines that information from the challenge response 414 is correct. In an implementation, a GSM challenge response mechanism is used between the electronic device 110 and the entitlement server 126. If the challenge response 414 is determined to be correct, the entitlement server 126 can then create a session for the electronic device 110 and send a created session 416 to the electronic device 110. In an example, the created session is utilized by the electronic device 110 to request credentials, without using SMS, as discussed below.

The electronic device 110, after receiving the created session 416, can send a request 418 for credentials, that can be issued without using SMS, to the entitlement server 126. The credentials described in FIG. 4 are similar (e.g., these credentials may also be utilized to request a PAC from the IDS server 120) to the previously described credentials issued over SMS in FIG. 3 with the notable difference of being issued without utilizing SMS messages and/or the SMS vendor server 124. The entitlement server 126, after receiving the request 418, may generate credentials for the electronic device 110, and create a digital signature including the credentials and the phone number associated with the electronic device 110. In an example, the credentials for the electronic device 110 may be in a form of a push token, which is an identifier for the electronic device 110 that can be utilized for requesting and/or issuing a phone authentication certificate for the electronic device 110. The entitlement server 126 sends a response 420 with the digital signature including the push token and the phone number. In an implementation, the entitlement server 126 is provided the push token by the electronic device 110 as part of the request 418.

After receiving the request 418 and prior to sending to the response 420, the entitlement server 126 uses the session information generated through the earlier challenge/response to look up the phone number associated with the SIM within the cellular service provider's own equipment. The phone number and push token are then formed into a payload and signed using a certificate (e.g., PKI) in possession of the entitlement server 126. In some examples, this certificate is the same as the HTTPS certificate used by the entitlement server 126. In such cases, the certificate is obtained from a third party certificate provider. The IDS server 120 then performs additional validations on the signing certificate chain when the credentials obtained without SMS are provided to the IDS server 120. In an example, the certificate may be a separate certificate used only for signing requests. When the certificate to sign the payload is separate from the HTTPS certificate, this certificate could be a certificate from a third party vendor. In this instance, the same additional validations discussed above are performed by the IDS server 120 when the IDS server 120 receives the credentials. In other instances, the certificate to sign the payload is a certificate provided by a particular entity (e.g., the manufacturer of the electronic device 110). In this example, when the credentials are signed with the certificate provided by the particular entity, the IDS server 120 performs additional validation of the original signing certificate in a different manner.

The electronic device 110, after receiving the response 420, sends a request 422 for authenticating the electronic device 110, where the request 422 includes the signature and the push token (e.g., the device credentials), to the IDS server 120. The IDS server 120, after receiving the request 422, validates the signature by checking against certificates at the IDS server 120 in order to ensure the chain of trust is valid, and generates a phone authentication certificate (PAC) for the electronic device 110. The IDS server 120 then sends a response 424 including the PAC to the electronic device 110. When using a third party certificate for signing the payload as discussed above, the IDS server 120 checks that the provider of the certificate has been whitelisted for the carrier. In an example, the IDS server 120 checks the next node in the chain of trust to ensure that the certificate validates to a known certificate root, and that the certificate came from a certificate authority that has specifically been known and verified through other channels to be valid for that carrier.

After the electronic device 110 receives the PAC (e.g., either using the communication flow in FIG. 3 or FIG. 4), the electronic device 110 may perform a further communication flow as part of authenticating a high security account (HSA) associated with the electronic device 110 where the PAC is further validated. In some implementations, authenticating the HSA is performed when a user creates an account with a service provider, enrolls in a standard (e.g., non-HSA) account that may not have security features, recovers an account where a user has forgotten a password, as part of managing or repairing the HSA account, or, more typically, to authenticate an existing HSA account. Such instances of authenticating the HSA may involve operations related to validating the PAC as discussed in connection with FIG. 5 below.

Further, in some implementations, a given electronic device interacts with an identity management services (IDMS) server (e.g., the IDMS server 122). The IDMS server 122, in an example, provides identity management services, manages a mapping of users' emails to respective user accounts, and keeps a record of trusted phone numbers associated with the user accounts. The electronic device (e.g., the electronic device 110) may interact with the IDMS server 122 to enable the IDMS server 122 to get proof that a user has ownership of an account, and also enable the IDMS server 122 to drive a user flow by providing one or more UIs that are presented to the user of the electronic device 110. The user flow may include the IDMS server 122 providing a UI that displays, as an example, a user name, entry field, and a password entry field as part of the user flow, and one or more interactions between a given electronic device and a server as part of the user flow (e.g., the user inputting a user name, password and/or other credential). In at least one implementation, the electronic device 110 may utilize the remote UI framework 220 to facilitate displaying a given UI from such a user flow as provided by the IDMS server 122.

Figure 6:
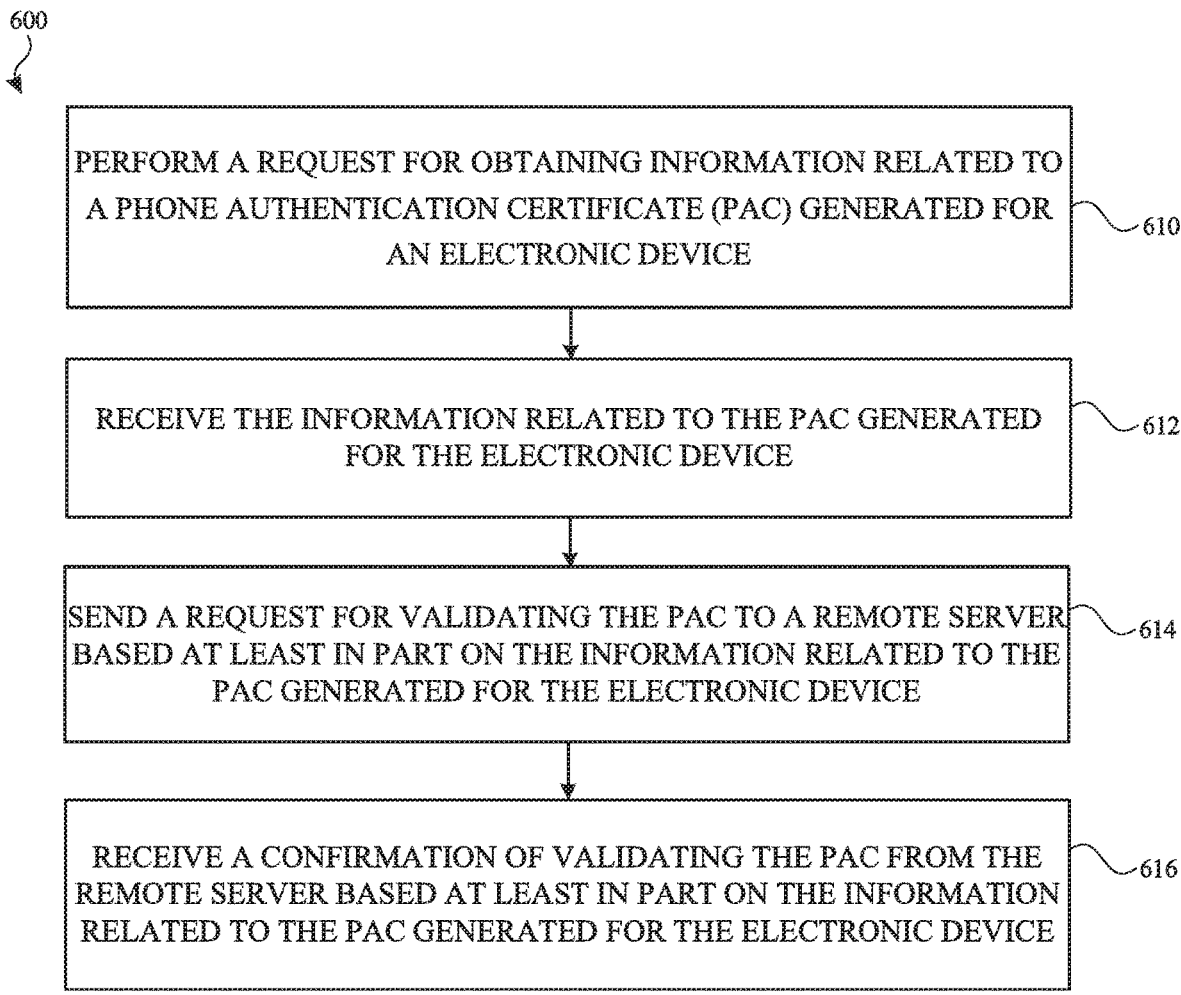
FIG. 6 illustrates a flow diagram of an example process for validating a phone authentication certificate on an electronic device in accordance with one or more implementations.

The following discussion in FIG. 6 relates to an example communication flow for proving that a user has ownership of a phone number for an account associated with given electronic device (e.g., the electronic device 110) that may be performed as part of a user flow between a given IDS server, a given IDMS server, and a given electronic device as discussed above. The follow discussion occurs after the electronic device 110 obtains the PAC as discussed above in FIG. 4, and now initiates additional processes for further validating the PAC (e.g., based on the example scenarios discussed for HSAs discussed above where further validation of the PAC may occur).

In one or more implementations, the electronic device 110 performs the following operations to generate information providing proof of the PAC ("PAC proof"), which is utilized to validate the PAC as discussed further below. In this regard, the PAC proof can confirm that the PAC was generated for the electronic device 110. The electronic device 110, in an implementation, utilizes the authentication kit framework 230 to make an API call via an IDS client for generating the PAC proof. In an implementation, the electronic device 110, using the authentication kit framework 230, performs the API call and includes a payload. The payload, however, is optional and may not be included when making the API call.

In an implementation, the generated PAC proof may include a nonce, a current timestamp, an optional payload, and a signature that is applied to the nonce, current timestamp and the optional payload (if applicable). Further, a machine identifier (MID) associated with the electronic device 110 in be included in the PAC proof in an example. Aspects of the MID is discussed further in the discussion of FIG. 5 below. Further, a phone number associated with the PAC may be included in the PAC proof in an implementation.

As a result of making the API call, the electronic device 110 receives the PAC proof, which includes the nonce, the current timestamp, the optional payload, and the signature that is applied to the nonce, current timestamp and/or optional payload (if applicable). As mentioned above, in one or more implementations, the PAC proof may also include the MID associated with the electronic device 110. Also, the PAC proof may include the phone number associated with the PAC. The PAC proof may then be included in a future request (e.g., as further discussed below in FIG. 5), from the electronic device 110, for validating the PAC associated with the electronic device 110 and/or to validate ownership of a phone number associated with the PAC.

Figure 5:
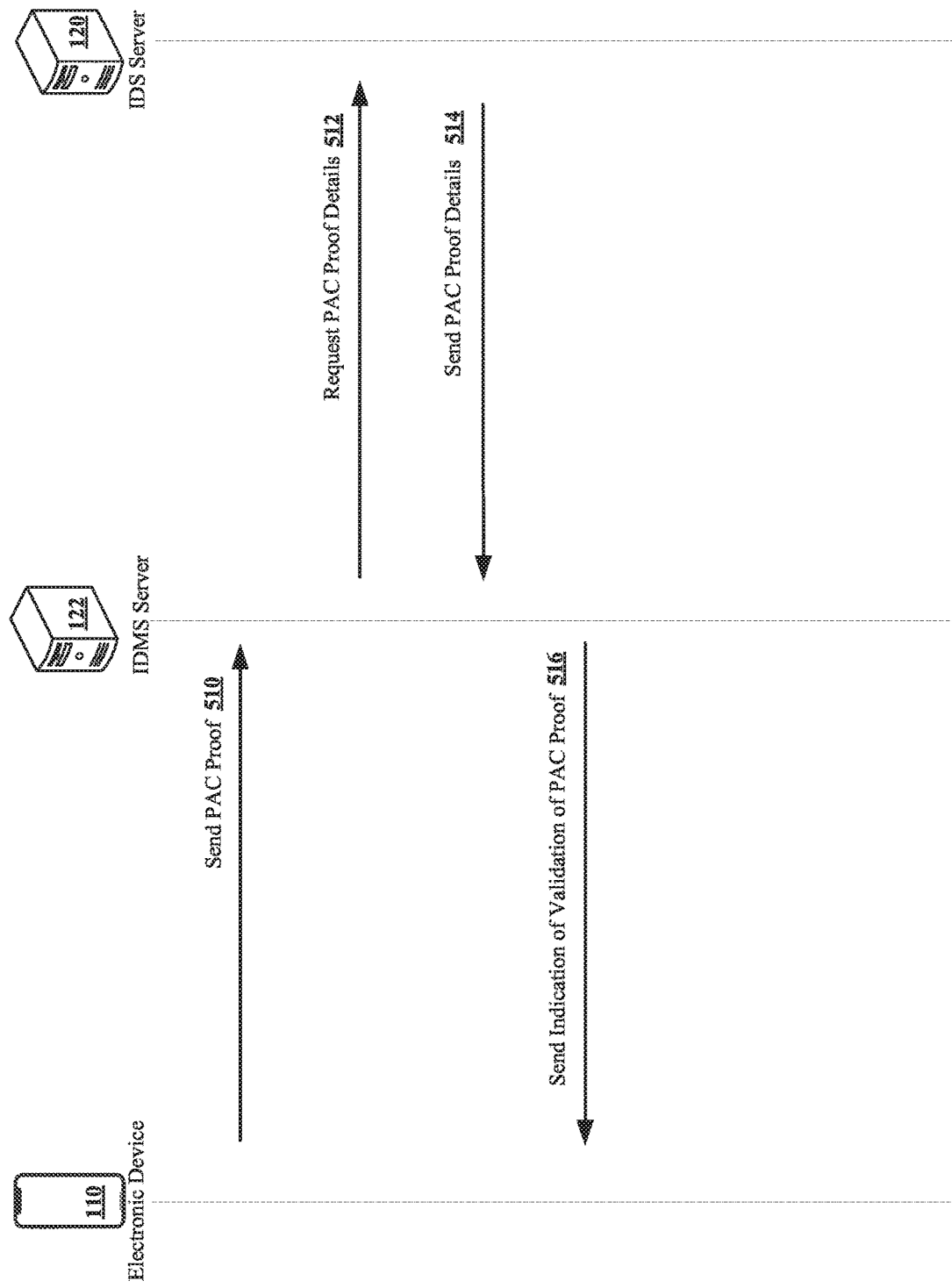
FIG. 5 illustrates an example sequence diagram showing communication for validating a phone authentication certificate using information for validating the phone authentication certificate, between computing devices over various communication channels.

FIG. 5 illustrates an example sequence diagram showing communication for validating a phone authentication certificate (PAC) using information related to a proof of the phone authentication certificate. FIG. 5 will be discussed with reference to components of FIG. 1, namely the electronic device 110, the IDMS server 122, and the IDS server 120. As shown, the diagram shows interactions between the electronic device 110, the IDMS server 122, and the IDS server 120. For explanatory purposes the PAC validation is described herein with reference to the IDMS server 122; however, the PAC validation system may be used by multiple different services, such as mobile payment services, and the like. For example, an API may be provided that allows other services to utilize the PAC validation system.

As mentioned above, validating a PAC may occur in instances involving HSAs (e.g., high security accounts).

The electronic device 110 sends a request 510 for validating a PAC (e.g., as received in the discussion of FIG. 3 or 4 above) where the request includes information providing proof of the PAC ("PAC proof") as discussed above. As discussed above, the information related to the proof of the PAC, for example, may be used to confirm that the PAC was generated for the electronic device 110 and/or to authenticate that the electronic device 110 has ownership of a phone number associated with the PAC. In one or more implementations, the PAC includes a machine identifier (MID) associated with the electronic device 110 and the PAC proof details (discussed further below) may include the MID in an implementation.

The MID may be associated with the electronic device 110 by being assigned to the electronic device 110 (e.g., by the IDMS server 122), by being included in firmware of the electronic device 110, etc. The MID in an example is verified and associated with the electronic device 110 prior to requesting the PAC (e.g., as described in FIGS. 3 and/or 4). In an example, a remote server, such as the IDMS server 122, generates a challenge related to a one-time password and sends the challenge to the electronic device 110. The electronic device 110, in response to receiving the challenge, generates the one-time password (OTP) and sends the OTP and the MID associated with the electronic device to the remote server. The remote server, after receiving the OTP and the MID, verifies the generated OTP from the electronic device 110. Upon verification of the generated OTP, the remote server indicates the MID is trusted and is associated with the electronic device 110.

The IDMS server 122, after receiving the request 510 including the PAC proof, communicates with the IDS server 120 to validate the PAC proof. The IDMS server 122 sends a request 512 for information regarding details for validating the PAC proof to the IDS server 120, where the request 512 includes the PAC proof. The IDS server 120, after receiving the request 512, analyzes the information included in the PAC proof and sends a response 514 including the details for validating the PAC proof. The IDS server 120, for example, validates that the PAC is valid (e.g., by using one or more certificates stored at the IDS server 120), and the signature included in the PAC proof is valid.

In an implementation, the details for validating the PAC proof, as provided in the response 514, include information such as, but not limited to, a phone number, a push token (e.g., the credentials associated with the electronic device 110), a MID, a usage timestamp related to when the PAC was last used by a service, an SMS timestamp related to when (if any) an SMS round trip took place for the SMS request and response communication flow (e.g., as discussed in FIG. 3), a generation timestamp related to when the PAC was generated, a validation strength (e.g., basic, intermediate, maximum) which may be configured by an administrator for use by the IDMS server 122, and a status of the PAC (e.g., valid, invalid, expired, etc.).

In one or more implementations, instead of including a usage timestamp, a map may be provided, where the map includes a key corresponding to a name of a calling service and a value of the key corresponding to a timestamp when the PAC was last used by each calling service. Thus, the IDMS server 122 may utilize the map to determine when the PAC was last used by other services (e.g., and electronic payment service or the IDS server 120) but ignore when the PAC was last used by the IDMS server 122. In this way, multiple requests by the IDMS server 122 will not artificially make it appear that the PAC was just recently used. Further, the validation strength (e.g., basic, intermediate, maximum) are indicators of how strong the validation is considered by the IDS server 120. In one or more implementations, the validation without SMS may be associated with a higher validation strength than the validation with SMS.

After receiving the details for validating the PAC proof from the response 514, the IDMS server 122 determines whether the PAC proof is validated based on one or more of the following conditions, which may be based on information provided in the PAC proof and/or by further querying the IDS server 120. The PAC is required to be associated with the phone number that is the trusted phone number for the account, which may be verified based on the phone number included in the PAC. The PAC is required to be younger (e.g., based on the generation timestamp) than the last password change for the account (e.g., for when the electronic device 110 gets stolen and the password is changed). Moreover, SMS timestamps for SMS messages that were utilized to generate the PAC (e.g., as described in FIG. 3) are required to have been within a predetermined past period of time (e.g., last 45 days), or the timestamp related to when the PAC was validated is required to be within the predetermined past period of time (e.g., the last 45 days), or the IDS server 120 is required to have utilized the PAC within the predetermined past period of the time based on a timestamp provided by the IDS server 120 to the IDMS server 122. Further, the MID in the PAC is required to match with the MID provided in the response 514.

Based on the above-discussed conditions, the IDMS server 122 sends a response 516 including an indication that the PAC proof was successfully validated or not. The electronic device 110, after receiving the response 516, may determine a future operation to perform based on the indication. For example, the electronic device 110 may send a message, including the PAC, using the service provider's network in response to a successful indication. Alternatively, the electronic device 110 may determine to utilize an SMS-based process for validating a phone number associated with the electronic device 110. In an implementation, the IDS server 120 may approve a re-validation request from the electronic device 110, and the electronic device 110 may check and verify the re-validation has been approved by IDS server 120 before the electronic device 110 attempts to perform that re-validation.

The following discussion of FIG. 6 relates to operations that may be performed, after successfully receiving a phone authentication certificate (PAC), by the electronic device 110 for obtaining information related to validating that the phone authentication certificate was generated for the electronic device 110.

FIG. 6 illustrates a flow diagram of an example process for validating a phone authentication certificate on the electronic device 110 in accordance with one or more implementations. For explanatory purposes, the process 600 is primarily described herein with reference to the electronic device 110 of FIGS. 1 and 2. However, the process 600 is not limited to the electronic device 110 of FIGS. 1 and 2, and one or more blocks (or operations) of the process 600 may be performed by one or more other components of other suitable devices. Further for explanatory purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

As illustrated in FIG. 6, the electronic device 110 performs a request for obtaining information related to a phone authentication certificate (PAC) that was generated for the electronic device 110 (610). The electronic device 110 receives the information related to the PAC generated for the electronic device 110, where the information related to the PAC confirms that the PAC was generated for the device (612). The electronic device 110 transmits a request for validating the PAC to a remote server, such as the IDMS server 122, based at least in part on the information related to the PAC generated for the electronic device 110 (614). The electronic device 110 receives a confirmation of validating the PAC from the remote server, such as the IDMS server 122, based at least in part on the information related to the PAC generated for the electronic device 110 (616). In an example, the PAC, when validated, confirms that the electronic device 110 owns a phone number associated with the PAC.

Figure 7:
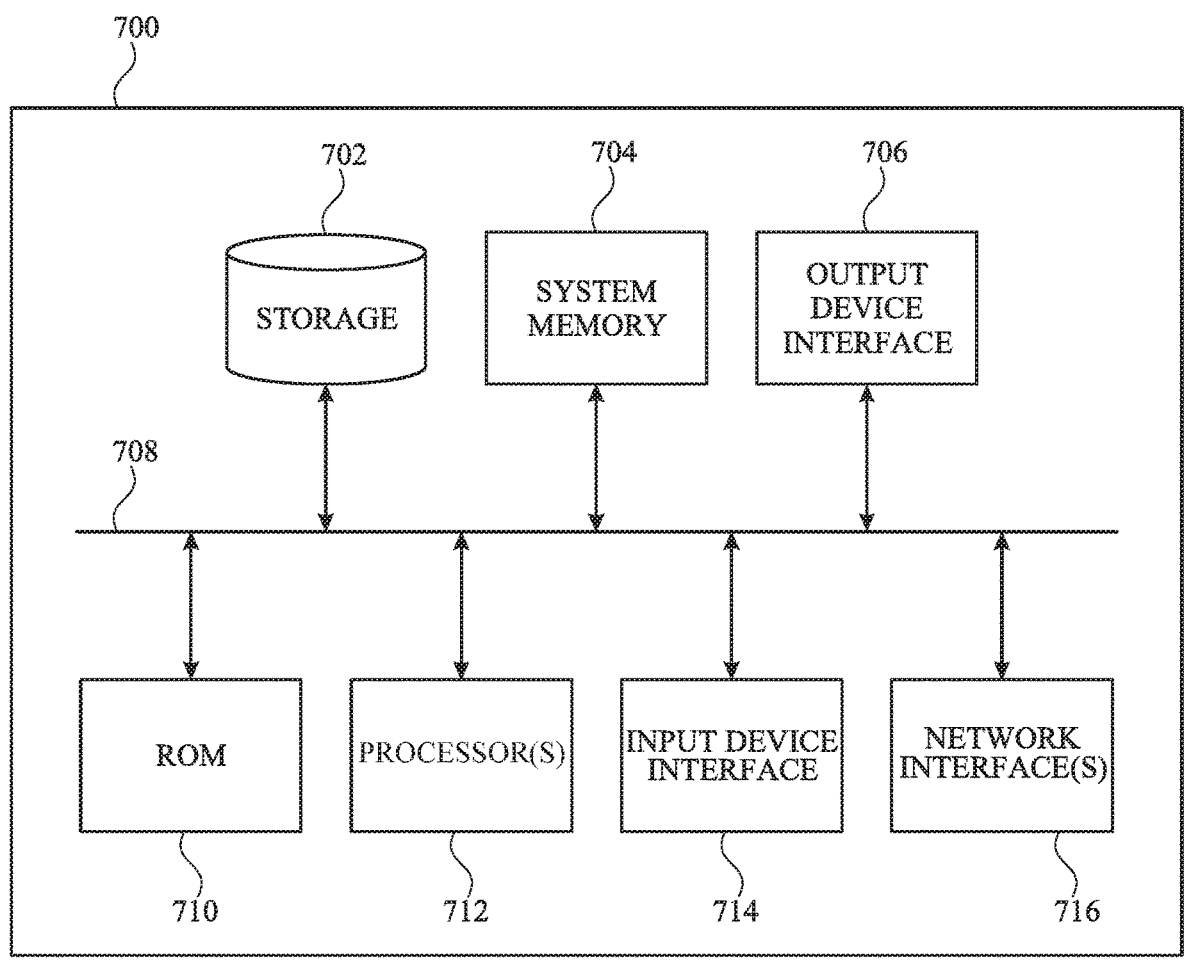
FIG. 7 illustrates an electronic system with which one or more implementations of the subject technology may be implemented.

FIG. 7 illustrates an electronic system 700 with which one or more implementations of the subject technology may be implemented. The electronic system 700 can be, and/or can be a part of, the electronic device 110, the IDS server 120, the IDMS server 122, the SMS vendor server 124, and/or the entitlement server 126 as shown in FIG. 1. The electronic system 700 may include various types of computer readable media and interfaces for various other types of computer readable media. The electronic system 700 includes a bus 708, one or more processing unit(s) 712, a system memory 704 (and/or buffer), a ROM 710, a permanent storage device 702, an input device interface 714, an output device interface 706, and one or more network interfaces 716, or subsets and variations thereof.

The bus 708 collectively represents all system, peripheral, and chipset buses that communicatively connect the numerous internal devices of the electronic system 700. In one or more implementations, the bus 708 communicatively connects the one or more processing unit(s) 712 with the ROM 710, the system memory 704, and the permanent storage device 702. From these various memory units, the one or more processing unit(s) 712 retrieves instructions to execute and data to process in order to execute the processes of the subject disclosure. The one or more processing unit(s) 712 can be a single processor or a multi-core processor in different implementations.

The ROM 710 stores static data and instructions that are needed by the one or more processing unit(s) 712 and other modules of the electronic system 700. The permanent storage device 702, on the other hand, may be a read-and-write memory device. The permanent storage device 702 may be a non-volatile memory unit that stores instructions and data even when the electronic system 700 is off. In one or more implementations, a mass-storage device (such as a magnetic or optical disk and its corresponding disk drive) may be used as the permanent storage device 702.

In one or more implementations, a removable storage device (such as a floppy disk, flash drive, and its corresponding disk drive) may be used as the permanent storage device 702. Like the permanent storage device 702, the system memory 704 may be a read-and-write memory device. However, unlike the permanent storage device 702, the system memory 704 may be a volatile read-and-write memory, such as random access memory. The system memory 704 may store any of the instructions and data that one or more processing unit(s) 712 may need at runtime. In one or more implementations, the processes of the subject disclosure are stored in the system memory 704, the permanent storage device 702, and/or the ROM 710. From these various memory units, the one or more processing unit(s) 712 retrieves instructions to execute and data to process in order to execute the processes of one or more implementations.

The bus 708 also connects to the input and output device interfaces 714 and 706. The input device interface 714 enables a user to communicate information and select commands to the electronic system 700. Input devices that may be used with the input device interface 714 may include, for example, alphanumeric keyboards and pointing devices (also called "cursor control devices"). The output device interface 706 may enable, for example, the display of images generated by electronic system 700. Output devices that may be used with the output device interface 706 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 7, the bus 708 also couples the electronic system 700 to one or more networks and/or to one or more network nodes, such as the electronic device 110 shown in FIG. 1, through the one or more network interface(s) 716. In this manner, the electronic system 700 can be a part of a network of computers (such as a LAN, a wide area network ("WAN"), or an Intranet, or a network of networks, such as the Internet. Any or all components of the electronic system 700 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
    performing, by a device, a request for obtaining information related to a phone authentication certificate (PAC) that was generated for the device, the PAC authenticating that a particular phone number is associated with the device;
    receiving the information related to the PAC, the information including an indication that the PAC was generated for the device;
    sending, from the device, a request for validating the PAC to a remote server based at least in part on the information related to the PAC, wherein the information related to the PAC includes a machine identifier that is used by the remote server to validate the PAC by matching with a second machine identifier associated with the user account; and
    receiving a confirmation of validating the PAC from the remote server based at least in part on the information related to the PAC.

2. The method of claim 1, wherein the PAC, when validated, confirms that the device owns the particular a phone number.

3. The method of claim 1, wherein the information related to the PAC further includes a machine identifier (ID) of the device, the machine ID being based on a one-time password provided by the device.

4. The method of claim 1, wherein the information related to the PAC further includes a nonce, a timestamp, and a payload, and a signature that has been applied to the nonce, the timestamp, and the payload.

5. The method of claim 1, wherein the PAC was previously received from an IDS server, the particular phone number is associated with a user account, the user account being associated with the device, and the device comprising a mobile smartphone.

6. The method of claim 1, wherein the remote server comprises an identity management services (IDMS) server.

7. The method of claim 6, wherein the IDMS server validates the PAC based on the information related to the PAC.

8. A system comprising;
    a processor;
    a memory device containing instructions, which when executed by the processor cause the processor to perform operations comprising:
        receiving, at a first server, a request for validating a phone authentication certificate (PAC), the request including information related to validating that the PAC was generated for a device;
        sending, by the first server, a request to a second server for validating the information related to validating that the PAC was generated for the device;
        receiving, from the second server, second information related to the PAC, wherein the second information includes a phone number associated with the device;
        validating the PAC associated with the information related to validating that the PAC was generated for the device based at least in part on the second information and based at least in part on credentials associated with the device and a timestamp of when the credentials were last used; and
        sending an indication of validating the PAC to the device.

9. The method of claim 1, wherein the confirmation indicates that the remote server validated the PAC based at least in part on credentials associated with the device and a timestamp of when the credentials were last used.

10. The method of claim 1, wherein the confirmation indicates that the remote server validated the PAC based at least in part on a timestamp of when the PAC was generated and a second timestamp of when a prior change of a password associated with a user account occurred.

11. The system of claim 8, wherein the validating is further based at least in part on a machine identifier of the device, included in the information related to the PAC, matching a second machine identifier associated with a user account.

12. The system of claim 8, wherein the PAC, when validated, confirms that the device owns the phone number associated with the PAC.

13. The system of claim 8, wherein the second information further includes a push token, and a machine identifier.

14. The system of claim 13, wherein the second information further includes a usage timestamp related to when the push token was last used, an SMS timestamp related to when an SMS round trip took place, and a generation timestamp related to when the PAC was generated.

15. The system of claim 8, wherein the second information further includes a status of the PAC.

16. The system of claim 8, wherein the second server comprises an identity services (IDS) server, the IDS server validates that the PAC is valid, and a signature included in the information related to the PAC is valid.

17. The system of claim 8, wherein validating the PAC is based on a machine identifier of the device, included in the information related to the PAC, matching a second machine identifier associated with a user account.

18. The system of claim 8, wherein validating the PAC is based on credentials associated with the device and a timestamp of when the credentials were last used.

19. The system of claim 8, wherein validating the PAC is based on a timestamp of when the PAC was generated and a second timestamp of when a prior change of a password associated with a user account occurred.

20. A non-transitory computer-readable medium comprising instructions, which when executed by a computing device, cause the computing device to perform operations comprising:

performing, by a device, a request for obtaining information related to a phone authentication certificate (PAC) that was generated for the device, the PAC authenticating that a particular phone number is associated with the device;

receiving the information related to the PAC, the information including an indication that the PAC was generated for the device;

sending, from the device, a request for validating the PAC to a remote server based at least in part on the information related to the PAC; and receiving a confirmation of validating the PAC from the remote server based at least in part on the information related to the PAC, wherein the confirmation indicates that the remote server validated the PAC based at least in part on credentials associated with the device and a timestamp of when the credentials were last used.

\* \* \* \* \*